United States Patent [19]

Yang et al.

[11] Patent Number: 4,906,716

[45] Date of Patent: Mar. 6, 1990

[54] METHOD OF INCORPORATING HYDROPHOBIC MONOMERS INTO ACRYLAMIDE SOLUTIONS

[75] Inventors: Henry W. Yang, Kingwood; Thomas J. Pacansky, Houston, both of Tex.

[73] Assignee: Exxon Chemical Patents Inc., Linden, N.J.

[21] Appl. No.: 195,060

[22] Filed: May 17, 1988

[51] Int. Cl.⁴ ............ C08F 2/10; C08F 2/04; C08F 220/56

[52] U.S. Cl. .............. 526/307.2; 526/303.1; 526/305; 526/307.4; 526/307.7

[58] Field of Search ........... 526/307.2, 307.7, 305, 526/307.4, 303.1

[56] References Cited

FOREIGN PATENT DOCUMENTS 0170608  9/1985  Japan ........................ 526/307.2
0831881  4/1960  United Kingdom ........... 526/307.2

*Primary Examiner*—Joseph L. Schofer
*Assistant Examiner*—F. M. Teskin
*Attorney, Agent, or Firm*—Robert L. Graham; John F. Hunt

[57] ABSTRACT

Hydrophobic water-insoluble monomers, such as alkyl acrylamides, which are solid at room temperature may be sufficiently dissolved in concentrated acrylamide or methacrylamide monomer solutions, in the absence of cosolvents, to allow copolymerization to occur without substantial phase separation. The hydrophobic monomer is added to the acrylamide monomer solution and heated, with agitation, to above the melting point of the hydrophobic monomer. Thereafter the temperature must be maintained at no lower than about 15° C. below the melting point.

13 Claims, No Drawings

METHOD OF INCORPORATING HYDROPHOBIC MONOMERS INTO ACRYLAMIDE SOLUTIONS

BACKGROUND OF THE INVENTION

1. Field of the Invention

The present invention provides a novel process for incorporating hydrophobic water-insoluble monomers which are solid at room temperature into acrylamide monomer solutions so as to permit the subsequent copolymerization of the monomers in the substantial absence of phase separation. In particular, the present invention is directed to a thermal process for incorporating alkyl acrylamides into an acrylamide monomer solution in the substantial absence of organic cosolvents.

2. Description of the Prior Art

Previous attempts at incorporating hydrophobic water-insoluble monomers into polymerizations to produce water-soluble polymers have entailed using various organic cosolvents to solubilize the hydrophobe. For instance, U.S. Pat. Nos. 3,919,140 and 3,969,329 disclose the use of about 15–30 percent by weight acetone in an acetone-water mixture to assist in the polymerization when hydrophobic monomers are added to an acrylamide polymerization. Similarly, U.S. Pat. No. 4,098,987 discloses the use of $C_1$ to $C_4$ alcohols, i.e., isopropanol, as cosolvents to disperse the hydrophobic monomers. In view of the ensuing chain transfer and reduction in molecular weight of the resultant polymer due to the large amount of cosolvent, there is need for improved methods of incorporating a hydrophobic monomer into a conventional water-soluble acrylamide polymer.

Alternatively, with the advent of water-in-oil emulsion polymerizations as means for preparing polyacrylamide emulsions, the addition of a hydrophobe has been accomplished by incorporating it into the oil phase; cf. U.S. Pat. Nos. 3,284,393, 3,624,019, 3,734,873, 4,152,307 and 4,452,940. However, in a solution polymerization there is no such oil phase available to provide solubility to the hydrophobe.

Finally, U.S. Ser. No. 904,908, filed Sept. 8, 1986, now abandoned, discloses a solution process for preparing hydrophobically functionalized cationic polymers. In this disclosure a water miscible cosolvent, i.e. acetone, methanol, isopropanol or mixtures thereof, is utilized to solubilize the water-insoluble monomer.

SUMMARY OF THE INVENTION

A process is described for incorporating hydrophobic water-insoluble monomers into acrylamide monomer solutions. The resultant solutions may be used directly to produce water-soluble polymers which are useful in the clean-up of waste waters containing organic and other contaminants. The process relies upon the use of thermal means to incorporate a solid hydrophobic water-insoluble monomer into a concentrated acrylamide monomer-water solution. Thus, the hydrophobic monomer is maintained in a dissolved state in an acrylamide solution during the subsequent polymerization without the need for miscible organic cosolvents, i.e. alcohols and/or ketones. The thermal process of the present invention entails (i) adding a hydrophobic water-insoluble monomer to a concentrated acrylamide monomer solution and heating, with agitation, to above the melting point of the hydrophobic monomer and (ii) thereafter maintaining the temperature of the resultant mixture at no lower than about 15° C. below the melting point.

Under this thermal process the monomer mixture remains a clear, uniform, homogenous mixture with no phase separation at low polymer conversion. As the polymerization reaction proceeds towards completion, some turbidity may occur but the solution is stable with regard to phase separation. The hydrophobic water-insoluble monomer remains dispersed on a very fine scale such that the polymerization may be effected without the substantial formation of particulates of water-insoluble polymer, i.e. gels.

DETAILED DESCRIPTION OF THE INVENTION

The thermal dissolution process of the present invention, which permits the incorporation of hydrophobic water-insoluble monomers into an acrylamide monomer solution in the substantial absence of a cosolvent so that the monomers may be copolymerized to form water-soluble polymers without substantial phase separation, comprise (i) adding a hydrophobic water-insoluble monomer to an acrylamide monomer solution while heating, and with agitation, to a temperature above the melting point of the hydrophobic monomer for a sufficient period of time to effect dissolution, and (ii) maintaining the temperature of the resultant mixture at no lower than about 15° C. below the melting point until polymerization is completed. The mixed monomer solution prepared above may then be conventionally polymerized by addition of other monomers if desired, dilution to desired concentration, deaeration via nitrogen purge or vacuum, correcting the temperature to the desired polymerization temperature (provided that it is not lower than about 15° C. below the melting point of the hydrophobic monomer), addition of sufficient free radical generating initiator to commence polymerization, and allowance of sufficient time to elapse to form the desired high molecular weight water-soluble polymer.

In addition other conventional components of a polymerization may be added, i.e., a chain transfer agent such as sodium hypophosphite and a sequestrant such as ethylenediaminetetraacetic acid (EDTA). The polymer may be recovered from the reaction mixture by any of a variety of techniques which are well-known to one skilled in the art of acrylamide polymers.

The hydrophobic water-insoluble monomers suitable for use in the thermal dissolution process of the present invention are those monomers which are solid at room temperature and which produce copolymers having desirable properties when copolymerized with acrylamide. Suitable such monomers have the following formula:

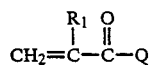

wherein $R_1$ is hydrogen or methyl and Q is $-NR_2R_3$ or $-OR_2$ wherein $R_2$ is a $C_4$ to $C_{22}$ alkyl, cycloalkyl or alkylaryl group and $R_3$ is hydrogen or a $C_1$ to $C_{22}$ alkyl, cycloalkyl or alkylaryl group. Examples of such monomers include alkyl acrylamides, alkyl methacrylamides, alkyl acrylates, alkyl methacrylates, the substituted styenes, i.e., alkylstyrenes. Preferably, the hydrophobic monomer is an alkyl acrylamide or methacrylamide having about 6 to about 16 carbon atoms in the alkyl group. Most preferably the hydrophobic monomer is an octylacrylamide, i.e. n-octyl or t-octyl acrylamide.

The melting points of some of the above-listed hydrophobic monomers are:

| Monomer | Melting Point, °C. |
| --- | --- |
| n-octylacrylamide | 30–35 |
| t-octylacrylamide | 55 |
| methyl-2-furanacrylate | 35–37 |
| benzyl-2-furanacrylate | 42–45 |
| stearyl methacrylate | 25–30 |

If desired, mixtures of hydrophobic monomers may be utilized. In such a case, obviously, the initial heating step must be sufficient to melt the highest melting monomer and the maintenance temperature must be no lower than about 15° C. below the highest melting point.

The thermal dissolution process may be performed in any convenient manner provided that the two temperature requirements are followed. For instance, solid hydrophobic monomer may be added to either room temperature or heated acrylamide solution, or the hydrophobic monomer may be melted singly and then added to heated acrylamide monomer solution, or the hydrophobic monomer may be melted in the presence of a small portion of the acrylamide monomer solution and than added to the balance of the acrylamide monomer solution which has been preheated. The specific order or mode of addition has not been found to be critical. Generally the hydrophobic monomer will be melted at a temperature only slightly above, i.e. about 5° C., its melting point and with agitation to ensure complete melting and then dissolution into the acrylamide monomer solution. The phrase "the melting point" is used herein to mean the temperature at which melting occurs under the actual conditions of melting. Thus, temperatures which may be somewhat below the published melting point are operable in the present invention and are included due to solute action of the acrylamide monomer solution. The critical feature is that once the hydrophobic monomer is completely melted and dispersed in the acrylamide monomer solution, the temperature must not be reduced to more than about 15° C. below the melting point. In the event that the temperature does go below this level, and polymerization has not been initiated, then the entire solution may be reheated to above the melting point and then held at this elevated temperature for a sufficient period to be certain that no unmelted hydrophobic monomer remains. If polymerization has been initiated when the temperature falls below the stated level, then the hydrophobic monomer will start to separate out and reincorporation by heating is nearly impossible.

The hydrophobic water-insoluble monomer is dissolved in an acrylamide or methacrylamide monomer solution. This solution will generally contain about 40 to 60 weight percent acrylamide or methacrylamide. Current commercially available acrylamide solutions containing a nominal 50 weight percent acrylamide are preferred merely for convenience sake. Depending on the amount of hydrophobic monomer which is to be incorporated into the eventual copolymer the acrylamide concentration of the acrylamide monomer solution could be as low as 10 weight percent, but a higher concentration will shorten the dissolution time and thus be more economical.

Once the hydrophobic monomer is incorporated into the acrylamide monomer solution as discussed above, the monomers may be polymerized in a conventional manner, as though the hydrophobic monomer were not even present, with the only additional requirement being not allowing the temperature to fall below the minimum explained above. Thus, any additional water-soluble monomers may be added to the mixed monomer solution, the solution diluted to the desired solids content, any air is removed, and polymerization commenced by the addition of a conventional free-radical initiator, preferably a water-soluble one. As all of these steps are well-known in the art and none form the basis of the present invention, further details are not included herein but may be found in the literature. It is to be noted, of course, that after the polymerization has been completed there is no further minimum temperature requirement.

The following non-limiting examples illustrate the thermal dissolution process of the present invention. All parts and percent are by weight unless otherwise specified.

EXAMPLE I 141.8 g. of acrylamide monomer solution containing 50 percent acrylamide is placed in a reaction vessel and deaerated by nitrogen purge. The solution is then heated to 55° C. by external heating. Then 4.1 g. of t-octylacrylamide, a hydrophobic water-insoluble monomer which melts at 55° C., in its solid form is added with agitation. The heating to 55° C. and the agitation are continued until the t-octylacrylamide is completely dissolved, i.e. about 30 minutes. Dissolution is confirmed by visual observation. 50 g. of a 50 percent solution of 3-methacrylamidopropyltrimethyl-ammonium chloride (MAPTAC) is added with agitation continuing and the temperature falling to 50° C. Them 280.1 g. of water is added slowly, while heating continues, to dilute the monomer solution to the desired 21 percent and 100 ppm of sodium hypophosphite is added as a chain transfer agent. The temperature of the solution remains above 45° C. throughout the addition. After a further deaeration, the polymerization is initiated by the addition of $K_2S_2O_8$. After stirring for about 16 hours and maintaining the temperature between 50° and 60° C. the viscous solution is poured slowly into acetone to precipitate the polymer.

The polymerization proceeds normally with no substantial gel formation. The resultant polymer is analyzed and found to contain 72 percent acrylamide, 25 percent MAPTAC, and 3 percent t-octyl acrylamide demonstrating that the hydrophobic water-insoluble monomer is incorporated into the polymer in accordance with the present invention.

EXAMPLE II

The procedure of Example I is repeated except that the t-octyl acrylamide is melted neat in a separate vessel and then added to the previously heated acrylamide monomer solution. Again the polymerization proceeds smoothly with no evidence of phase separation.

EXAMPLE III

The procedure of Example I is repeated except that the t-octylacrylamide is added to the acrylamide monomer solution which is at only 50° C. The mixture is allowed to agitate for a few hours at this temperature and the t-octylacrylamide is found to be completely dissolved. This is expected even though the absolute temperature is slightly below the melting point of the t-octylacrylamide since solute dissolution will also occur. The subsequent polymerization proceeds smoothly and produces the desired polymer.

COMPARATIVE EXAMPLE A

A 1 liter resin kettle was fitted with a water condenser, heating mantle, thermometer, temperature controller, inert gas sparger, injection port and mechanical stirrer. Acrylamide, MAPTAC, and t-octyl acrylamide in an 88:10:2 mole percent ratio were combined at room temperature and diluted to 21 percent with deionized water. The reactor contents were heated to 70° C., the reaction temperature, while sparging with nitrogen and polymerization was immediately initiated with $K_2S_2O_8$. A second injection of initiator was added after 1 hour. The polymerization was complete in 3 to 5 hours.

The resultant polymer was an unusable polymeric gel that had to be chipped out of the kettle. Its viscosity was beyond the measurement capabilities of the Contraves low shear viscometer, i.e. greater than 150,000 cp. Analysis of a portion thereof showed that little or none of the t-octyl acrylamide entered into the polymerization. Thus merely polymerizing a hydrophobic monomer-containing solution at an elevated temperature does not result in the incorporation of the monomer in the resultant copolymer unless the process of this invention is followed.

COMPARATIVE EXAMPLE B

The procedure of Comparative Example A is repeated except that the polymerization is attempted at 25° C. When gelation seems to be starting the polymerization is aborted by replacing the nitrogen sparge with oxygen. Analysis of the polymer that is produced finds it to contain no measurable level of t-octylacrylamide.

• EXAMPLE IV

The procedure of Example I is repeated except that the t-octylacrylamide is replaced by equivalent molar amounts of the hydrophobic water-insoluble monomers listed below. The dissolution temperatures and the subsequent polymerization temperature are as specified. In each case the dissolution temperature, i.e. the temperature of the acrylamide monomer to which the hydrophobic monomers is added, is above the melting point of the hydrophobic monomer, and sufficient time is allowed for dissolution to occur, a smooth polymerization with no phase separation is observed and the resultant polymer has incorporated at least one-half of the hydrophobic comonomer which is in the solution.

| Sample | Hydrophobic Monomer | Dissolution Temp. °C. | Polymerization Temp. °C. |
|---|---|---|---|
| a. | n-octylacrylamide | 40 | 25 |
| b. | methyl-2-furanacrylate | 40 | 30 |
| c. | benzyl-2-furanacrylate | 50 | 42 |
| d. | stearyl methacrylate | 35 | 25 |
| e. | ethyl-2-furanacrylate | 40 | 25 |
| f. | 2-methoxystyrene | 40 | 25 |

What is claimed is:

1. A method for incorporating a hydrophobic water-insoluble monomer into an acrylamide or methacrylamide monomer solution in the substantial absence of a cosolvent so that the monomers may be copolymerized without substantial phase separation which comprises:
    (i) adding a hydrophobic water-insoluble monomer which is solid at room temperature to an acrylamide or methacrylamide monomer solution and heating, while agitating, to above the melting point of the hydrophobic monomer for a sufficient period of time to effect dissolution; and
    (ii) maintaining the temperature of the resultant mixture at no lower than about 15° C. below said melting point to copolymerize the hydrophobic monomer and the acrylamide or methacrylamide monomer.
2. The method of claim 1 wherein the hydrophobic monomer is added in a solid form.
3. The method of claim 1 wherein the hydrophobic monomer has been melted prior to its addition to the acrylamide or methacrylamide monomer solution.
4. The method of claim 1 wherein the acrylamide monomer solution comprises about 40 to about 60 weight percent acrylamide prior to the addition of the hydrophobic monomer.
5. The method of claim 1 wherein the hydrophobic monomer has the following formula

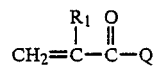

wherein $R_1$ is hydrogen or methyl, and Q is selected from $-NR_2R_3$ and $-OR_2$ wherein $R_2$ is a $C_4$ to $C_{22}$ alkyl, cycloalkyl or alkylaryl group and $R_3$ is hydrogen or a $C_1$ to $C_{22}$ alkyl, cycloalkyl or alkylaryl group.
6. The method of claim 5 wherein Q is $-NR_2R_3$.
7. The method of claim 6 wherein $R_2$ is an alkyl group having about 6 to about 16 carbon atoms and $R_3$ is hydrogen.
8. The method of claim 1 wherein the hydrophobic monomer is an octylacrylamide.
9. The method of claim 8 wherein the octylacrylamide is t-octylacrylamide.
10. The method of claim 9 wherein the dissolution of the t-octylacrylamide occurs at a temperature of at least about 55° C. and the resultant mixture is maintained at a temperature of at least about 40° C.
11. The method of claim 3 wherein the melting is performed in the presence of a minor amount of an acrylamide monomer solution which contains about 40 to about 60 weight percent acrylamide.
12. The method of claim 2 wherein the acrylamide or methacrylamide monomer solution has been deaerated prior to the addition of the hydrophobic monomer.
13. A method for incorporating a hydrophobic water-insoluble monomer into an acrylamide or methacrylamide monomer solution in the substantial absence of a cosolvent so that the monomers may be copolymerized without substantial phase separation which comprises:
    (i) heating a mixture of a solid hydrophobic monomer and an acrylamide or methacrylamide monomer solution above the melting point of the hydrophobic monomer for a sufficient period of time to effect dissolution; and
    (ii) polymerizing said monomers while maintaining the temperature of the resultant solution at no lower than about 15° C. below said melting point until polymerization is completed.

* * * * *